United States Patent [19]

Poza

[11] 3,737,580

[45] June 5, 1973

[54] SPEAKER AUTHENTICATION UTILIZING A PLURALITY OF WORDS AS A SPEECH SAMPLE INPUT

[75] Inventor: Fausto Poza, Cupertino, Calif.

[73] Assignee: Stanford Research Institute, Menlo Park, Calif.

[22] Filed: Jan. 18, 1971

[21] Appl. No.: 107,156

[52] U.S. Cl. ....179/1 SB

[51] Int. Cl. ....G10l 1/02

[58] Field of Search....179/1 SB, 1 SA, 1 VS, 179/2 CA; 340/149 R, 146.3 C, 146.3 T; 324/77

[56] References Cited

UNITED STATES PATENTS

| | | | |
|---|---|---|---|
| 3,280,257 | 10/1960 | Orthuber | 179/1 SB |
| 3,525,811 | 8/1970 | Trice | 179/1 SB |
| 3,036,268 | 5/1962 | Smith | 179/1 SB |
| 3,466,394 | 9/1969 | French | 179/1 SB |
| 3,509,280 | 4/1970 | Jones | 179/1 SB |
| 3,202,761 | 8/1965 | Bibbero | 179/1 VS |
| 3,482,211 | 12/1969 | Claris | 340/146.3 C |
| 3,587,097 | 6/1971 | Stull | 324/77 E |

OTHER PUBLICATIONS

Jones and Murray, Adaptive Averaging Circuit, IBM Technical Disclosure Bulletin, 4/1968, p. 1685–1686.

*Primary Examiner*—Kathleen H. Claffy
*Assistant Examiner*—Jon Bradford Leaheey
*Attorney*—Flehr, Hohbach, Test, Albritton & Herbert

[57] ABSTRACT

A method and system for talker authentication in which a trial speech sample from a person who may be legitimate or who may be an imposter is compared to a standard speech sample of the legitimate person. The trial speech sample forms the input to a plurality of band pass filters. The outputs of each of the filters are integrated over the duration of the speech sample and the integrated signals are normalized. These normalized signals are compared to normalized signals of a standard speech sample to generate a plurality of difference signals. The magnitudes of the difference signals are added together to generate an authenticity signal, the magnitude of which corresponds to the correspondence between the trial speech sample and the standard speech sample.

8 Claims, 3 Drawing Figures

FAUSTO POZA
INVENTOR.

BY Fehr, Hohbach, Test, Albritton & Herbert
ATTORNEYS

FAUSTO POZA
INVENTOR.

BY Flehr, Hohbach, Test, Albritton & Herbert
ATTORNEYS

SPEAKER AUTHENTICATION UTILIZING A PLURALITY OF WORDS AS A SPEECH SAMPLE INPUT

BACKGROUND OF THE INVENTION

This invention pertains to a method and system of talker authentication for comparing a trial speech sample from a person who may be legitimate or an imposter to a legitimate speech sample of the legitimate person.

It is desirable to have a simple and rapid means for identifying a person directly from the person's voice. Such a system would be of especial advantage in transacting business over the telephone, for example, in which the only personal characteristic available for verification is the person's voice. Some prior systems exist for attempting to recognize speech patterns by a frequency analysis thereof. Such systems attempt to compare individual sounds such as the pronunciation of vowels or consonants in a trial speech sample to the pronunciation of those vowels or consonants in a standard speech sample. These prior systems are very complicated and hence expensive, and have not proved to be a reliable means for talker authentication.

SUMMARY OF THE INVENTION

Accordingly, it is an object of this invention to provide an improved method and system for talker authentication.

It is a more specific object of this invention to provide a simple method and system for talker authentication which compares long term spectra in speech patterns.

Briefly, in accordance with one embodiment of the invention, there is provided a method and system of talker authentication in which a trial speech sample from a person who may be legitimate or an imposter is compared to a standard speech sample of the legitimate person. The trial speech sample is separated into a plurality of frequency bands. The magnitudes of these frequency bands are integrated over the duration of the trial speech sample to form integrated signals. These integrated signals are normalized and compared to normalized standard signals for the legitimate person to generate a plurality of difference signals. The difference signals are added together to form an authenticity signal and the magnitude of the authenticity signal indicates the correspondence between the trial speech sample and the standard speech sample.

DESCRIPTION OF THE PREFERRED EMBODIMENTS

Figure 1:
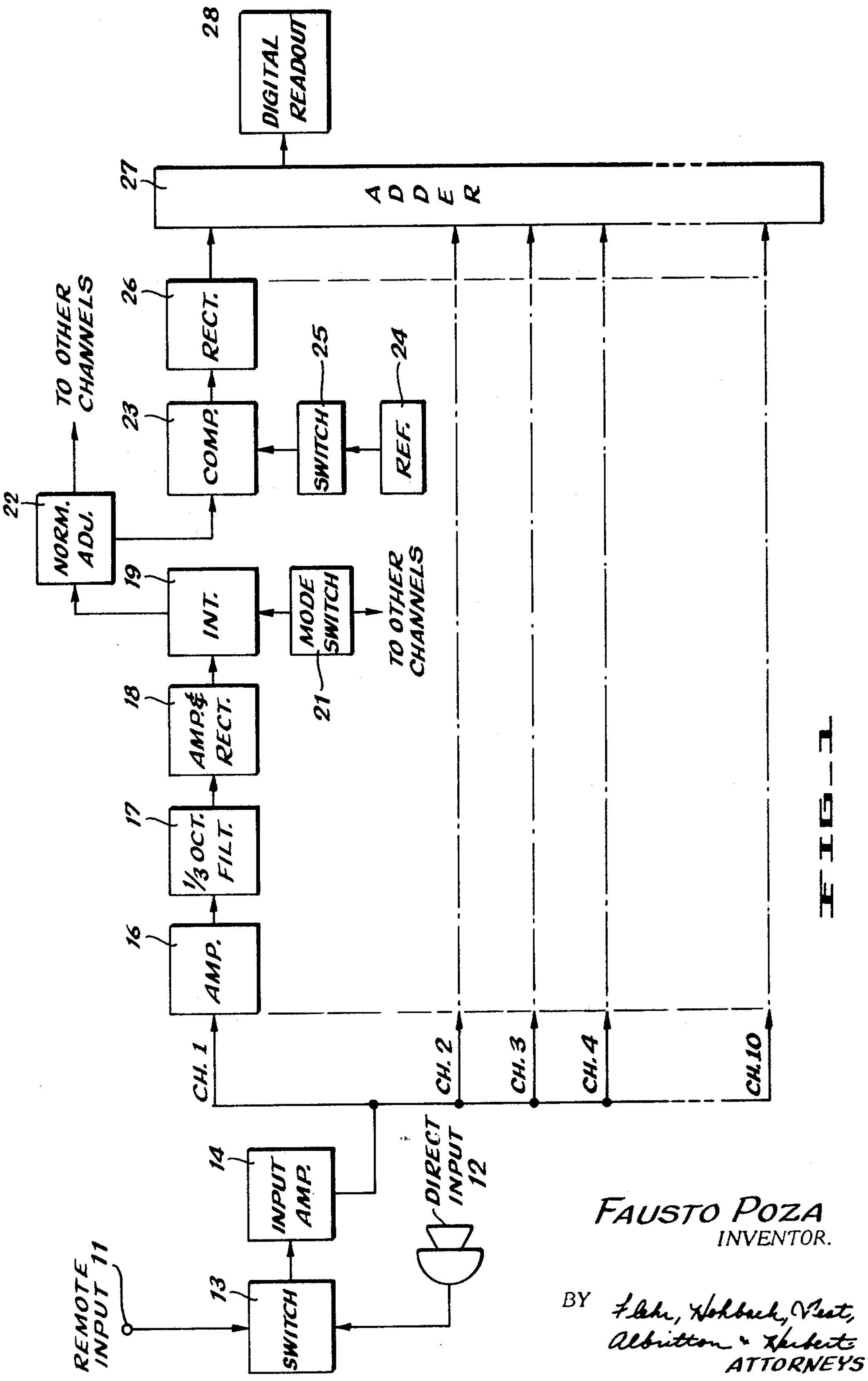
FIG. 1 is a system diagram of a ten channel talker authentication system.

The system shown in FIG. 1 includes a remote input 11 and a direct input 12 which may be, for example, as shown in FIG. 1, a standard telephone handset for converting speech into electrical speech signals. These inputs are selectively connected through a switch 13 to an input amplifier 14. The output of amplifier 14 feeds a plurality of filter networks which are indicated in FIG. 1 as channels 1 through 10. Each of the channels 1 through 10 is identical with the exception of the pass band filter characteristics thereof so that only apparatus for channel 1 is shown in FIG. 1. It should be understood that more or less than 10 channels can be provided as desired.

The filter network for channel 1 includes an amplifier stage 16 and a band pass filter 17. The band pass filter 17 is, for example, a ⅓ octave filter with the pass bands of each of the filters in the successive channels 2 through 10 covering successive ⅓ octave ranges so that in combination the 10 channels cover the frequency band of the human voice, which is approximately 270 Hz to 2,750 Hz.

Referring again specifically to channel 1, the output of filter 17 is further amplified and full wave rectified by an amplifier and rectifier circuit 18. The amplified and rectified output is applied to an integrator 19. The integrator 19 is controlled by a mode switch 21 to operate in either of three modes. These three modes are reset, talk and hold. The same mode switch 21 also controls the integrators in the other channels 2 through 10. The output of integrator 19 is applied through a normalization adjustment network 22 to a comparator 23. The comparator 23 also receives a reference signal from a reference circuit 24 and compares the signal on its input to generate an output which is applied through a full wave rectifier 26 to an adder 27. The same adder 27 receives signals from all of the channels 1 through 10. The output of adder 27 is displayed on a digital readout device 28 which may, for example, be a digital voltmeter.

In operation, each of the ⅓ octave filters in the channels 1 through 10 passes only those frequencies falling within its pass band which are contained in the input signal. Thus, for example, in channel 1 the ⅓ octave filter 17 only passes portions of the input signal which are comprised of frequencies in its pass band. The signals are amplified and rectified over the amplifier and rectifier circuitry 18 and applied to the input of integrator 19. The integrator 19 is operable in three modes — reset, talk and hold.

In the reset position the integrator 19 (and the corresponding integrators in channels 2 through 10) is essentially grounded so that it is not operational. The integrator 19 becomes operational when the mode switch 21 is switched to the talk position and functions to integrate the magnitude signals received from the amplifier and rectifier circuitry 18. The integrator 19 continues to integrate the magnitude signals while the mode switch 21 is in the talk position so that a signal level is continuously built up on the integrator over the entire duration of the trial speech input signal. When the mode switch 21 is switched to the hold position, the input to the integrator 19 from the amplifier and rectifier circuitry 18 is removed, thus holding the output of the integrator 19 at the integrated signal level which it had attained at the point at which the mode switch was switched to hold.

At this point the integrator 19 and the corresponding integrators 2 to 10 are holding signals which are voltages, for example, and which are a measure of the frequency distribution of the input signal energy over ranges of frequencies corresponding to the pass bands for the ⅓ octave filters in each of the channels. These voltages are then normalized by the normalization adjustment circuitry 22 which adjusts the sum of the outputs of all the integrators in channels 1 through 10 to some predetermined value. That is, the normalization adjustment circuitry 22 allows all the integrator outputs to be uniformly adjusted either up or down from their original value in order to adjust the total energy in the speech input as it appears on the integrators to some preselected, standard value.

After the integrated signals generated by the trial speech input have been suitably normalized, they are compared on a channel-by-channel basis with a standard pattern of signals which is stored in the form of a plurality of adjustable DC reference voltages, one for each of the channels 1 through 10. These adjustable DC reference voltages are obtained by having the legitimate person utter a standard phrase, such as "My name is John Smith," and performing a frequency analysis of this standard speech sample as more fully discussed hereinafter. The trial speech input is an utterance of the same phrase as was utilized in obtaining the standard speech sample.

Comparison is done by a comparator 23 which receives a reference signal for channel 1 from a reference signal source 24. The comparator 23 generates a difference signal proportional to the difference between the normalized integrated signal for channel 1 and the reference signal value for channel 1. This difference signal is full wave rectified by a rectifier 26 and applied to an adder 27. The adder 27 also receives rectified difference signals from each of the other channels 2 through 10. The sum output of the adder 27 is an authenticity signal, whose magnitude corresponds to the correspondence between the trial apeech input and a standard speech sample and may be displayed, for example, on a digital readout device 28 which can be a digital voltmeter.

The standard speech sample signals which are stored in the reference voltage sources for each of the channels (reference voltage source 24 for channel 1) may also be obtained utilizing the system of FIG. 1. This can be done, for example, by integrating the standard speech sample and utilizing the normalization adjustment circuit 22 to adjust the sum of the outputs of all the integrators in channels 1 through 10 to some predetermined standard value. Then the normalized voltage outputs of the integrators in channels 1 through 10 represent the energy distribution of the standard speech sample across a range of frequencies corresponding to the pass bands for the ⅓ octave filters in each of the channels. These voltage values then form a standard set of reference signals which correspond to a particular talker uttering a particular phrase and which may be measured and recorded. On authenticating a talker these standard signals are set on the adjustable reference voltage sources for each of the channels, such as the reference voltage source 24 for channel 1. Then a trial speech sample comprising an utterance of the same particular phrase is compared on a channel-by-channel basis to the standard speech sample stored in the form of a plurality of DC voltages on the reference voltage sources.

The switch 13 selectively connects either the remote output 11 or the direct input 12 through the input amplifier 14 to the channels 1 through 10 and may include appropriate isolation circuitry. The input amplifier 14 comprises an operational amplifier, a Fairchild No. 741, for example, and provides approximately a 27dB gain over the audio range. Similarly, the amplifier 16 is an operational amplifier which may again be a Fairchild 741. The amplifier and rectifier circuit 18 may also comprise an operational amplifier which may be a Fairchild 741, together with a full wave rectifier. The amplifier and rectifier circuitry 18 in conjunction with the amplifier 16 provide approximately 30dB additional gain.

Figures 2, 3:
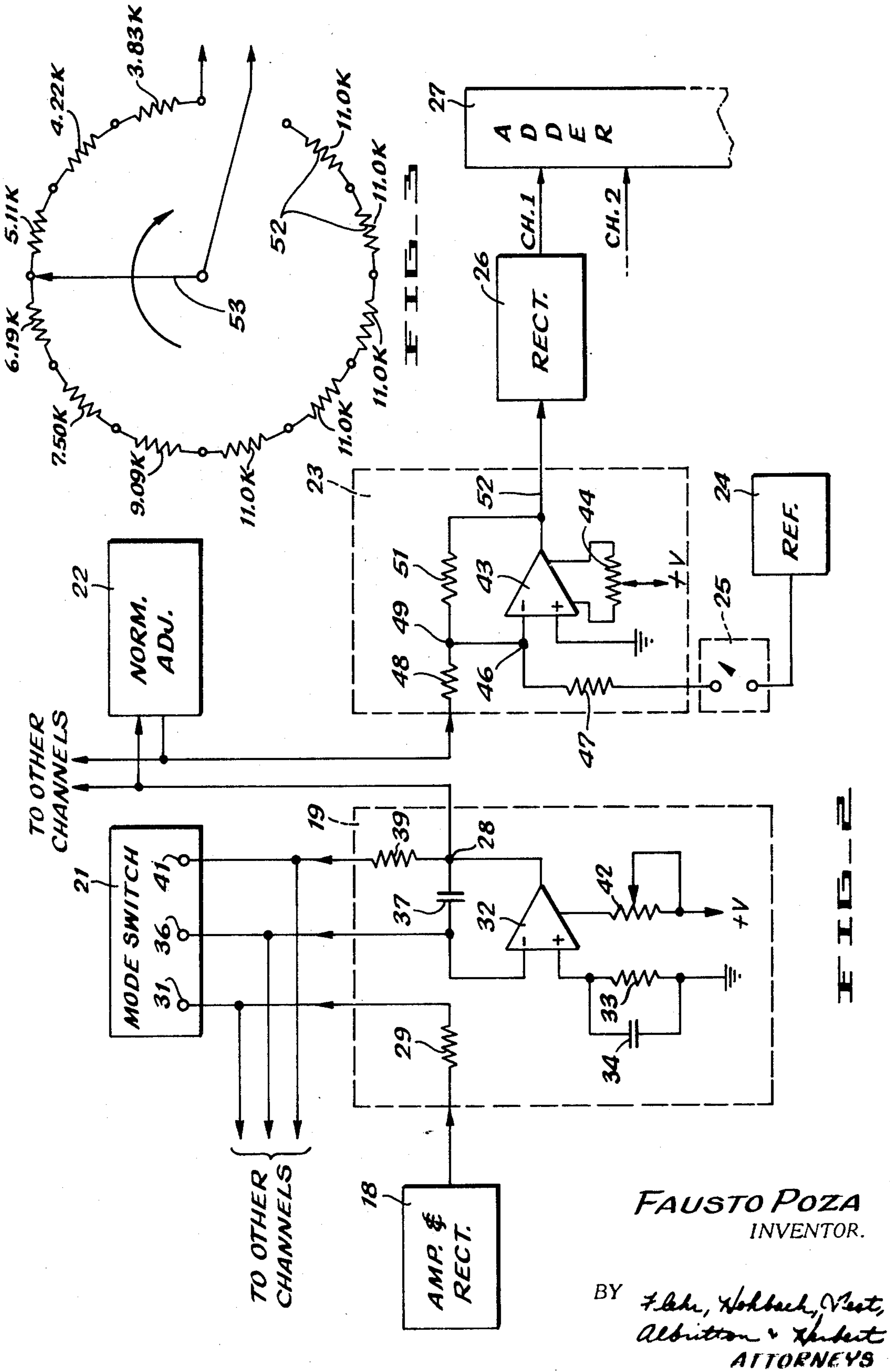
FIG. 2 is a schematic circuit diagram of the integrator and comparator circuits shown in block diagram form in FIG. 1.
FIG. 3 is a schematic circuit diagram of a portion of the normalization circuit shown in block diagram form in FIG. 1.

Referring now to FIG. 2, there is shown details of the circuitry of the integrator 19 and the comparator 23. The output of the amplifier and rectifier circuit 18 forms the input to the integrator 19. The integrator 19 includes a current limiting resistor 29 which is connected to a terminal 31 of the mode switch 21. The integrator 19 includes an operational amplifier 32 which may be a Zeltex Model No. 134. The positive input terminal of operational amplifier 32 is connected through a biasing resistor 33 and bypass capacitor 34 to ground. The negative input terminal of operational amplifier 32 is connected to a terminal 36 of the mode switch 21 and also through a capacitor 37 to a terminal 38. A terminal 38 is connected through a resistor 39 to a terminal 41 of the mode switch 21. The output of the operational amplifier 32 is also connected to the terminal 38. A potentiometer 42 is included for connecting the operational amplifier 32 to a source of voltage +V. Terminal 38 forms the output of the integrator 19 and this output forms the input to a normalization adjust circuit 22. The normalization adjust circuit 22 has an output which forms the input to the comparator 23. The comparator 23 includes an operational amplifier 43 which may be a Fairchild (No.) 741. A suitable source of voltage, −V, is connected through a potentiometer 44 to the operational amplifier 43. The positive input terminal of the operational amplifier 43 is connected to ground and the negative input terminal of operational amplifier 43 is connected to a terminal 46. Terminal 46 is connected through a resistor 47 to a switch 25. Switch 25 is in turn connected to a reference voltage source 24. The normalization adjust circuit 22 is connected through a resistor 48 to a terminal 49. Terminal 46 is connected to terminal 49 and terminal 49 is connected through a resistor 51 to the output 52 of the operational amplifier which forms the input to a rectifier circuit 26.

In operation, the mode switch 21 has three positions — reset, talk and hold. When the mode switch is at reset, terminals 36 and 41 are connected together which placed the resistor 39 across the feedback capacitor 37. This transforms the operational amplifier 32 into a 40dB attenuator. When the mode switch is turned to talk, terminal 36 is disconnected from terminal 41 and is connected to terminal 31 which allows the input signal from the amplifier and rectifier circuitry 18 to reach the operational amplifier 32, which is functioning as an integrator with a time constant, for example, of 0.25 second. When the desired input signal from the amplifier and rectifier circuitry 18 has ended, the mode switch 21 is switched to hold. This disconnects terminal 31 from terminal 36 and also leaves terminal 36 disconnected from terminal 41 which causes the voltage level attained at the integrator output at terminal 38 to be maintained at that value indefinitely.

As shown in FIG. 2, the normalization adjust circuit 22 and the mode switch 21 are also connected to the other channels 2 through 10 for controlling the integrators therein in a manner similar to that of channel 1.

The output of the integrator 19 forms the input to the normalization adjust circuit 22, a portion of which is shown in FIG. 3. The normalization adjust circuit 22 comprises a plurality of potentiometers, each having a plurality of series connected resistances. FIG. 3 shows only the potentiometer section for one channel. Ten identical potentiometer sections are provided, one for each of the channels 1 through 10. Each potentiometer section comprises a plurality of resistances generally indicated by reference numeral 52. A common wiper 53 is provided for all ten sections of the potentiometer. In this manner, the input resistors in the paths from the integrators are all uniformly varied. This functions to uniformly adjust the outputs of all the integrators in channels 1 through 10 up or down in order to insure that the overall energy pattern of the analyzed trial speech input is compatible in total magnitude with the standard speech sample stored in the voltage reference sources. This eliminates the necessity of having to precisely control the magnitude of the trial speech input while it is being taken.

The reference voltage source 24 is connected to the operational amplifier 43 of the comparator 23 through a switch 25. During normalization, the switch 25 is opened so that the input to the operational amplifier 43 is simply the output of the integrator 19 taken through the normalization adjust circuit 22. In this manner the sum voltage displayed on the digital readout device 28 will simply be the sum of the outputs of all the integrators in channels 1 through 10. The normalization adjust circuitry 22 is then adjusted so that this sum voltage displayed on the digital readout device 28 is a predetermined value corresponding to the predetermined sum value of all the standard voltages stored in the reference voltage sources for the channels 1 through 10 (reference voltage source 24 for channel 1).

After the outputs of the integrators have been normalized, the switch 25 is returned to the closed position so that the output of the integrator for each channel is compared to the voltage stored in the reference voltage source for that channel. The difference between these two values may be positive or negative so that another full wave rectifier circuit 26 is provided to assure that the sum obtained is that of the absolute value of the differences of each of the ten channels. Thus the output of the adder 27 is a voltage which may be called an authenticity signal which is the sum of the absolute values of the differences between portions of a trial speech sample and a standard speech sample of each of ten frequency channels 1 through 10. This signal may be displayed on a digital readout device 28 which may be, for example, a digital voltmeter and serves as a measure of the amount of correspondence between the standard speech sample and the trial speech sample.

If the criterion values for accepting or rejecting a talker as legitimate is set at any given value of the authenticity signal, then the percentage of legitimate talkers incorrectly rejected (insult rate) and the percentage of imposters incorrectly accepted (cheating rate) may be determined experimentally. Using prototype apparatus constructed in accordance with the principles of this invention it has been found that if the criterion value for the authenticity signal is selected so as to yield equal insult and cheating rates, that correct decisions result at least 83 percent of the time.

Thus what has been described is an improved talker authentication apparatus and method for determining whether a talker is legitimate or an imposter. The method and system compare long term spectra in speech patterns and may be relatively inexpensively implemented.

I claim:

1. A method of talker authentication for comparing a trial speech sample from a person who may be legitimate or an imposter to a legitimate speech sample of the legitimate person comprising the steps of obtaining a trial speech sample of a predetermined plurality of words, separating the trial speech sample into a plurality of frequency bands, integrating the magnitude of the respective frequency bands of the trial speech sample over the entire duration of the trial speech to form integrated trial signals, one for each of the plurality of frequency bands, comparing the trial signals respectively to standard signals for the legitimate person to generate a plurality of difference signals, and adding the respective difference signals to form an authentication signal, the magnitude of the authentication signal indicating the correspondence between the trial speech sample and the standard speech sample.

2. A method in accordance with claim 1 including the step of normalizing the integrated trial signals to form normalized trial signals which are compared to the standard signals.

3. A method in accordance with claim 1 including generating the standard signals for the legitimate person by separating the legitimate speech sample into a plurality of frequency bands, integrating the magnitude of the respective frequency bands of the legitimate speech sample over the duration of the standard speech to form said standard signals, and recording the magnitudes of said standard signals.

4. A method in accordance with claim 3 including the step of normalizing the standard signals by uniformly adjusting their respective magnitudes so that the sum of their magnitudes is a predetermined value.

5. A talker authentication system for analyzing speech of a trial talker in order to determine whether the trial talker is legitimate or an imposter comprising input means adapted to receive a speech sample of a predetermined plurality of words and generate an electrical speech signal in response thereto, a plurality of filter networks for separating said electrical speech signal into a plurality of frequency band signals, integration means for integrating each of said frequency band signals over the entire duration of the speech input to form a plurality of integrated signals, one for each of the frequency band signals, means for generating a plurality of standard signals characteristic of a legitimate talker, and comparator means for comparing each of said standard signals respectively to each of the integrated signals to generate difference signals whereby the magnitudes of said difference signals are an indication of the correspondence between the trial talker and the legitimate person.

6. A talker authentication system as in claim 5 including normalization means for uniformly adjusting the magnitudes of said plurality of integrated signals so that their sum is a predetermined value.

7. A talker authentication system as in claim 5 including adder means for summing said plurality of difference signals to form an authenticity signal, the magnitude of said authenticity signal serving to generally indicate whether the trial talker is legitimate or an imposter.

8. A talker authentication system as in claim 5 wherein said means for generating a plurality of standard signals characteristic of a legitimate talker comprises a plurality of adjustable voltage sources having voltage outputs for synthesizing said plurality of standard signals.

* * * * *